(12) United States Patent
Komiyama et al.

(10) Patent No.: US 11,482,189 B2
(45) Date of Patent: Oct. 25, 2022

(54) INFORMATION PROCESSING APPARATUS AND CONTROL METHOD

(71) Applicant: Lenovo (Singapore) Pte. Ltd., Singapore (SG)

(72) Inventors: Hirohide Komiyama, Kanagawa (JP); Minori Takao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/451,962

(22) Filed: Oct. 22, 2021

(65) Prior Publication Data
US 2022/0199051 A1 Jun. 23, 2022

(30) Foreign Application Priority Data
Dec. 21, 2020 (JP) .............................. JP2020-211398

(51) Int. Cl.
G09G 5/00 (2006.01)
(52) U.S. Cl.
CPC ..... *G09G 5/006* (2013.01); *G09G 2310/0243* (2013.01); *G09G 2370/04* (2013.01)
(58) Field of Classification Search
CPC .......... G09G 5/006; G09G 2310/0243; G09G 2370/04
See application file for complete search history.

(56) References Cited

U.S. PATENT DOCUMENTS

2014/0292670 A1* 10/2014 Cho ...................... G06F 1/1647
345/173
2016/0253144 A1* 9/2016 Huang .................... G06F 3/038
345/2.2

FOREIGN PATENT DOCUMENTS

| CN | 201403147 Y | 2/2010 |
| JP | H10-214070 A | 8/1998 |
| JP | 2005-100241 A | 4/2005 |
| JP | 2009-003882 A | 1/2009 |
| JP | 2019-199024 A | 11/2019 |
| WO | 2019/227908 A1 | 12/2019 |
| WO | WO-2019227908 A1 * | 12/2019 |

OTHER PUBLICATIONS

Analog Devices. "2:1 HDMI/DVI Switch with Equalization and DDC/CEC Buffers." Advantiv Advanced Television Solutions by Analog Devices, pp. 1-28.
(Continued)

*Primary Examiner* — Xin Sheng
(74) *Attorney, Agent, or Firm* — Osha Bergman Watanabe & Burton LLP

(57) ABSTRACT

An information processing apparatus includes a first processor coupled to a first memory and programmed to execute a first operation system (OS) to output a first image signal, a second processor coupled to a second memory and programmed to execute a second OS to output a second image signal, the second processor being separate from the first processor, a display interface including a configuration channel (CC) signal line and an image signal line, a first switch that switches between connecting or disconnecting the CC signal line to both the first processor and the second processor, and a second switch that switches between connecting the image signal line to the first image signal or to second image signal.

8 Claims, 3 Drawing Sheets

(56) References Cited

OTHER PUBLICATIONS

Texas Instruments. "HD3SS215 6.0 Gbps HDMI DisplayPort 2:1/1:2 Differential Switch." Texas Instruments Inc., May 2014, pp. 1-20.
Extended European Search Report issued in corresponding European Patent Application No. 21212115.6 dated Jun. 3, 2022 (36 pages).

* cited by examiner

INFORMATION PROCESSING APPARATUS AND CONTROL METHOD

CROSS-REFERENCE TO RELATED APPLICATIONS

This application claims priority to Japanese Patent Application No. 2020-211398 filed Dec. 21, 2020, the contents of which are hereby incorporated herein by reference in their entirety.

TECHNICAL FIELD

The present disclosure relates to an information processing apparatus and a control method.

BACKGROUND

A display device connected to an information processing apparatus such as a personal computer may output, for example, EDID (Extended Display Identification Data) as information related to the specifications of the display device. The information processing apparatus acquires this EDID upon system startup or when the display device is connected to control the display of the display device based on the acquired EDID.

SUMMARY

According to one or more embodiments of the invention, an information processing apparatus includes a first processor coupled to a first memory and programmed to execute a first operation system (OS) to output a first image signal, a second processor coupled to a second memory and programmed to execute a second OS to output a second image signal, the second processor being separate from the first processor, a display interface including a configuration channel (CC) signal line and an image signal line, a first switch that switches between connecting or disconnecting the CC signal line to both the first processor and the second processor, and a second switch that switches between connecting the image signal line to the first image signal or to second image signal.

DETAILED DESCRIPTION OF THE INVENTION

An information processing apparatus may have a system equipped with two or more OSs (Operating Systems). When respective image signals based on respective processing by the two or more OSs are switched and displayed on one display device, since neither an OS boot event nor a connection event with the display device newly occurs, the EDID is not issued from the display device and the information processing apparatus cannot receive the EDID. Therefore, the information processing apparatus may not be able to properly switch displays by the respective processing of the two or more OSs.

In view of the above, it may be desirable to provide an information processing apparatus and a control method to properly switch displays by respective processing of two or more OSs in a system equipped with the two or more OSs.

Embodiments of the present disclosure will be described in detail below with reference to the accompanying drawings.

First, the outline of an information processing apparatus according to one or more embodiments will be described.

[Hardware Configuration of Information Processing Apparatus]

Figure 1:
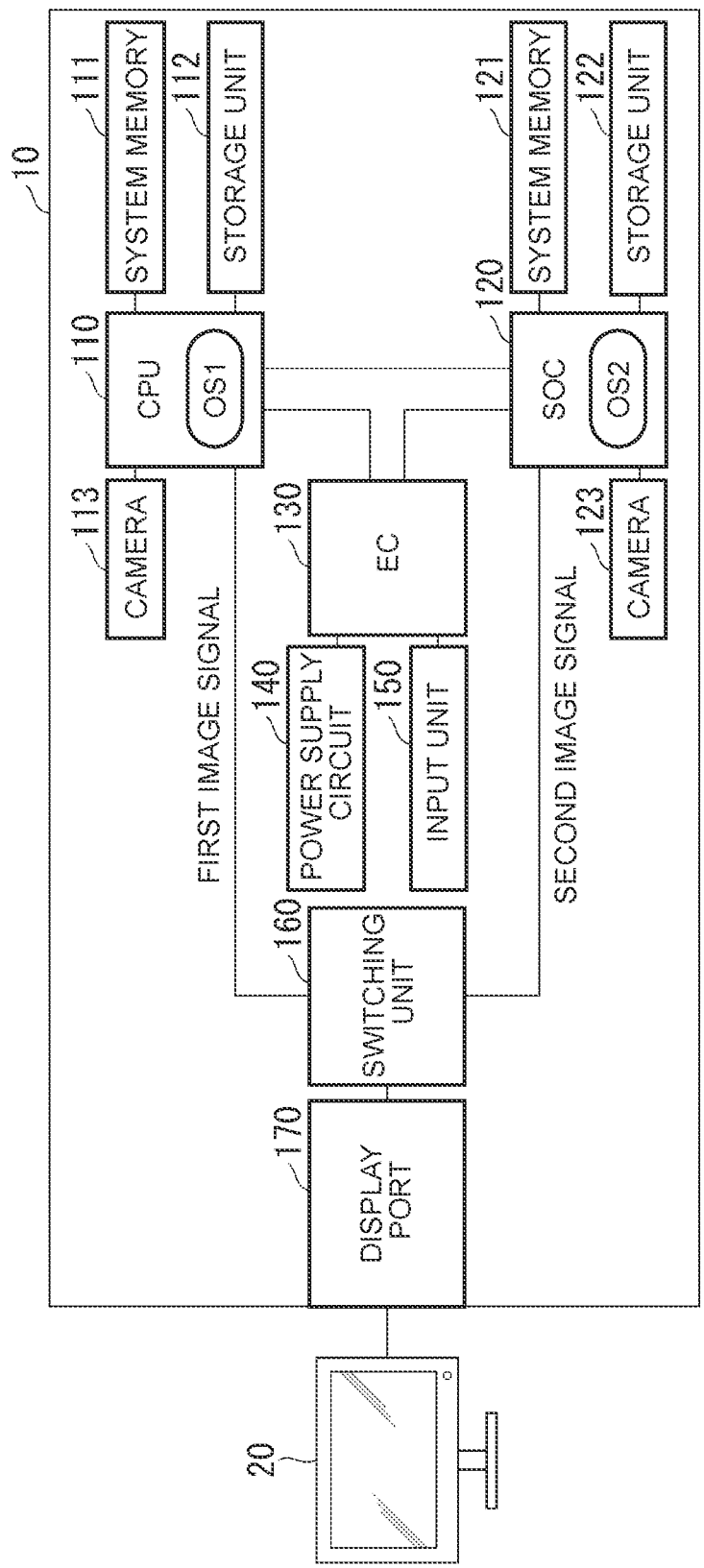
FIG. 1 is a block diagram illustrating an example of the hardware configuration of an information processing apparatus according to an embodiment.

FIG. 1 is a block diagram illustrating an example of the hardware configuration of an information processing apparatus 10 according to one or more embodiments. The information processing apparatus 10 is, for example, a desktop PC (Personal Computer).

The information processing apparatus 10 includes a CPU 110, a system memory 111, a storage unit 112, a camera 113, a SOC 120, a system memory 121, a storage unit 122, a camera 123, an EC 130, a power supply circuit 140, an input unit 150, a switching unit 160, and a display port 170.

The CPU 110 (an example of a first processing unit) may include a CPU (Central Processing Unit) which executes processing based on an OS1, a chipset (for example, PCH: Platform Controller Hub), and the like. The OS1 is an example of an OS (Operating System). For example, the OS1 is Windows (registered trademark).

The chipset included in the CPU 110 includes controllers, such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset. For example, the plural devices include the system memory 111, the storage unit 112, the camera 113, the SOC 120, the EC 130, and the switching unit 160.

The CPU 110 may also include a component to perform specific operations and processing such as a GPU (Graphics Processing Unit) to perform processing related to image display.

The system memory 111 is a writable memory used as reading areas of programs executed by the CPU 110 or working areas to which processing data of the executed programs are written. The system memory 111 may include, for example, plural DRAMs (Dynamic Random Access Memories) and the like.

The storage unit 112 may include a flash ROM (Read Only Memory), and an HDD (Hard Disk Drive) or an SSD (Solid State Drive). For example, the storage unit 112 stores the OS1, programs such as various drivers and various applications running on the OS1, and various data.

The camera 113 is an imaging device which captures images (video, still images, and the like) by the function of the OS1 and the function of an application running on the OS1. For example, the camera 113 is provided on the front side of the information processing apparatus 10 (generally, on the side facing a user using the information processing apparatus 10) to be able to capture an image of the user using the information processing apparatus 10. The camera 113 outputs captured image data under the control of the CPU 110. The CPU 110 stores, in the storage unit 112, the image data output from the camera 113.

The SOC 120 (an example of a second processing unit) may be, for example, a SOC (System On a Chip) in which plural ICs such as a CPU, a chipset, and a GPU are integrated on one chip. The SOC 120 executes processing based on an OS2. The OS2 is an example of another OS (Operating System). For example, the OS2 is Android (registered trademark). The SOC 120 is connected to the system memory 121, the storage unit 122, the camera 123, the CPU 110, the EC 130, the switching unit 160, and the like.

The system memory 121 is a writable memory used as reading areas of programs executed by the SOC 120 or working areas to which processing data of the executed programs are written. The system memory 121 may, for example, include plural DRAMs and the like.

The storage unit 122 may include a flash ROM, and an HDD or an SSD. For example, the storage unit 122 stores the OS2, programs such as various drivers and various applications running on the OS2, and various data.

The camera 123 is an imaging device which captures images (video, still images, and the like) by the function of the OS2 and the function of an application running on the OS2. For example, the camera 123 is provided on the front side of the information processing apparatus 10 (generally, on the side facing the user using the information processing apparatus 10) to be able to capture an image of the user using the information processing apparatus 10. The camera 123 outputs captured image data under the control of the SOC 120. The SOC 120 stores, in the storage unit 122, the image data output from the camera 123.

The EC 130 is an embedded controller for monitoring and controlling various devices (peripheral devices, sensors, and the like) regardless of processing of the CPU 110 and the SOC 120, which is an example of a microcomputer. The EC 130 has functions of power supply control and control of an input device (for example, as the function of a keyboard controller). For example, the EC 130 performs control on the power supply circuit 140 such as control of power supplied from the power supply circuit 140 to each unit in response to system startup or according to the operating state of the system. Further, the EC 130 acquires an operation signal from the input unit 150 based on operation input to the input unit 150 (for example, to the keyboard). Then, the EC 130 transmits the acquired operation signal to either one or both of the CPU 110 and the SOC 120. Further, the EC 130 performs switching control of image signals to be described later.

The power supply circuit 140 may be, for example, a DC/DC converter, an AC/DC adapter, and the like. For example, the power supply circuit 140 converts DC voltage supplied from an external power supply such as the AC/DC adapter (unillustrated) into plural voltages required to operate the information processing apparatus 10. Further, the power supply circuit 140 supplies power to each unit of the information processing apparatus 10 under the control of the EC 130.

The input unit 150 acquires an operation signal from an input device, such as a keyboard on which multiple keys (an example of operators) to accept a user's operation are arranged or a mouse to accept a user's operation. Note that the input unit 150 may also acquire an operation signal from a touch panel, a touch pad, or the like. The input unit 150 transmits the acquired operation signal to the EC 130.

Under the control of the EC 130, the switching unit 160 selectively outputs, to the display port 170, either one of the image signal (hereinafter called "first image signal") output from the CPU 110 and the image signal (hereinafter called "second image signal") output from the SOC 120. The first image signal is an image signal generated by the CPU 110 based on processing by the OS1. For example, the first image signal includes an image signal such as a desktop screen of the OS1 or the screen of a window of an application running on the OS1. The second image signal is an image signal generated by the SOC 120 based on processing by the OS2. For example, the second image signal includes an image signal such as a desktop screen of the OS2 or the screen of a window of an application running on the OS2.

The display port 170 (an example of an interface unit) is an example of an image interface unit to which the display device 20 is connected. The display port 170 outputs, to the display device 20 being connected, an image signal selected by the switching unit 160 from the first image signal and the second image signal.

The display device 20 is, for example, a liquid crystal display or an organic EL display to display an image (for example, a desktop screen or the screen of a window) based on the image signal output from the display port 170.

In other words, the information processing apparatus 10 can switch between the first image signal based on processing by the OS1 and the second image signal based on processing by the OS2 to display either one of the image signals on the display device 20 through the display port 170.

Note that the display device 20 may be an external monitor (external display) externally connected to the information processing apparatus 10, or a built-in monitor configured integrally with the information processing apparatus 10. A PC with the information processing apparatus 10 and the display device 20 integrally configured is also called an all-in-one PC.

[Configuration of Switching Control of Image signals]

Figure 2:
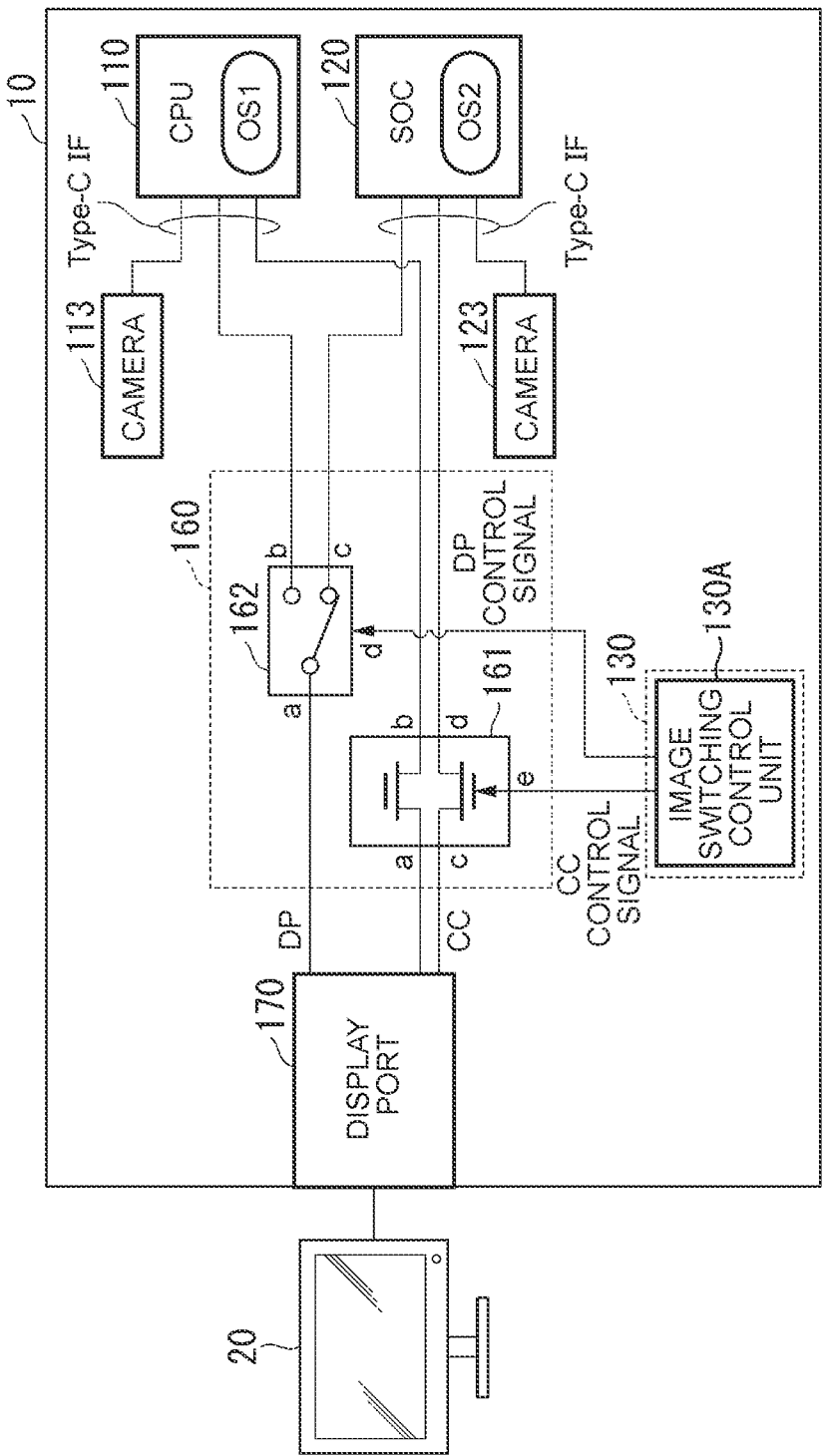
FIG. 2 is a block diagram illustrating an example of the configuration of switching control of image signals according to one or more embodiments.

Next, the configuration of switching control of image signals in the information processing apparatus 10 will be described in detail. FIG. 2 is a block diagram illustrating an example of the configuration of switching control of image signals according to one or more embodiments, that is, a block diagram illustrating the details of a configuration related to switching control of image signals in the configuration of the information processing apparatus 10 illustrated in FIG. 1. In FIG. 2, components corresponding to those in FIG. 1 are given the same reference numerals.

The information processing apparatus 10 includes the CPU 110, the camera 113, the SOC 120, the camera 123, an image switching control unit 130A, the switching unit 160, and the display port 170. The image switching control unit 130A is one of functional components executed, for example, by the EC 130. The switching unit 160 includes a first switching unit 161 and a second switching unit 162.

Each of the CPU 110 and the SOC 120 is connected to the display port 170 using a USB Type-C interface, respectively. Note that each of the CPU 110 and the SOC 120 is also connected to various other devices using a USB 2.0 Type-C interface, respectively. In the example illustrated in FIG. 2, the camera 113 as an example of one of the devices connected to the CPU 110 by using the USB 2.0 Type-C interface and the camera 123 as an example of one of the devices connected to the SOC 120 by using the USB 2.0 Type-C interface are illustrated, but the present disclosure is not limited to these devices.

Each of the CPU 110 and the SOC 120 outputs an image signal to the display port 170 connected by using the USB Type-C interface, respectively. Signal lines to connect the CPU 110 and the SOC 120 respectively to the display port 170 include a CC (Configuration Channel) signal line (an example of a first signal line) to transmit a CC signal (an example of a first signal), and a DP (Display Port) signal line (an example of a second signal line) to transmit a DP signal (an example of a second signal).

The CC signal line transmits a CC signal according to the connection between the display device 20 and the display port 170. For example, the CC signal is High when the display device 20 is connected to the display port 170, and Low when the display device 20 is not connected to the display port 170. Strictly, the CC signal is not just High or Low, and communication based on a protocol defined in the USB Type-C Alternate Mode standard is performed. Here, for ease of description, it is described that the CC signal is High when the display device 20 is connected to the display port 170 and Low when the display device 20 is not connected to the display port 170. Each of the CC signal lines connected respectively to the CPU 110 and SOC 120 is connected to the display port 170 through the first switching unit 161.

The first switching unit 161 may be, for example, a photo MOS (Metal Oxide Semiconductor) relay. One end of the CC signal line is connected to the display port 170, and the first switching unit 161 is connected to the other end of the CC signal line to switch (i.e. select) whether to electrically connect the CC signal line to the CPU 110 and the SOC 120 or to electrically disconnect therefrom.

For example, as illustrated in FIG. 2, the other end of the CC signal line on the CPU 110 side, where the one end thereof is connected to the display port 170, is connected to a terminal a of the first switching unit 161. Further, the other end of the CC signal line on the CPU 110 side, where the one end thereof is connected to the CPU 110, is connected to a terminal b of the first switching unit 161. On the other hand, the other end of the CC signal line on the SOC 120 side, where the one end thereof is connected to the display port 170, is connected to a terminal c of the first switching unit 161. Further, the other end of the CC signal line on the SOC 120 side, where the one end thereof is connected to the SOC 120, is connected to a terminal d of the first switching unit 161.

One end of a CC control signal line is connected to the image switching control unit 130A, and the other end of the CC control signal line is connected to a control terminal e to control switching of the first switching unit 161. The CC control signal line transmits a CC control signal output from the image switching control unit 130A. For example, when the CC control signal is High, the terminal a and the terminal b, and the terminal c and the terminal d are electrically connected, respectively. On the other hand, when the CC control signal is Low, the terminal a and the terminal b, and the terminal c and the terminal d are electrically disconnected, respectively.

In other words, when the CC control signal is High, both the CC signal line on the CPU 110 side and the CC signal line on the SOC 120 side are electrically connected to the display port 170. At this time, since the display device 20 is connected to the display port 170, the CC signal is High, for example. On the other hand, when the CC control signal is Low, both the CC signal line on the CPU 110 side and the CC signal line on the SOC 120 side are electrically disconnected from the display port 170. At this time, since the ends of the CC signal lines are not connected to the display device 20 as seen from the CPU 110 and SOC 120 sides though the display device 20 is connected to the display port 170, the CC signal is Low, for example.

The DP signal line transmits EDID (Extended Display Identification Data) including information related to the specifications of the display device 20 connected to the display port 170, and a DP signal such as an image signal output from each of the CPU 110 and the SOC 120. The DP signal line connected respectively to each of the CPU 110 and the SOC 120 is connected to the display port 170 through the second switching unit 162.

The EDID is a data format for exchanging, between devices, information related to the specifications of the display device 20 (such as a display resolution and a refresh rate) defined by the VESA (Video Electronics Standards Association) standard. Data on the device manufacturer name, the model number, the serial number, the screen size, the display resolution (the number of display pixels), the aspect ratio, the refresh rate, and the like are writable into the EDID.

The second switching unit 162 may be, for example, switch circuit using a transistor, an analog switch IC, a video switch IC, or the like. One end of the DP signal line is connected to the display port 170, and the second switching unit 162 is connected to the other end of the DP signal line to switch to (i.e. select) which of the CPU 110 and the SOC 120 the DP signal line is to be connected.

For example, as illustrated in FIG. 2, the other end of the DP signal line, the one end of which is connected to the display port 170, is connected to a terminal a of the second switching unit 162. Further, the other end of the DP signal line on the CPU 110 side, where the one end thereof is connected to the CPU 110, is connected to a terminal b of the second switching unit 162. Further, the other end of the DP signal line on the CPU 110 side, where one end thereof is connected to the SOC 120, is connected to a terminal c of the second switching unit 162.

One end of a DP control signal line is connected to the image switching control unit 130A, and the other end of the DP control signal line is connected to a control terminal d to control turning of the switch of the second switching unit 162. The DP control signal line transmits a DP control signal output from the image switching control unit 130A. For example, when the DP control signal is High, the terminal a and the terminal b are electrically disconnected, and the terminal a and the terminal c are electrically connected. On the other hand, when the DP control signal is Low, the terminal a and the terminal c are electrically disconnected, and the terminal a and the terminal b are electrically connected.

In other words, when the DP control signal is High, the DP signal line on the SOC 120 side is electrically connected to the display port 170. In this state, the SOC 120 can receive EDID issued from the display device 20 connected to the display port 170, and an image signal corresponding to the EDID can be output from the SOC 120 to the display device 20 through the display port 170. On the other hand, when the DP control signal is Low, the DP signal line on the CPU 110 side is electrically connected to the display port 170. In this state, the CPU 110 can receive the EDID issued from the display device 20 connected to the display port 170, and an image signal corresponding to the EDID can be output from the CPU 110 to the display device 20 through the display port 170.

When switching the image signal to be displayed on the display device 20 from one of the first image signal and the second image signal to the other, the image switching control unit 130A (an example of a control unit) controls switching by the first switching unit 161 and switching by the second switching unit 162.

For example, when switching the image signal to be displayed on the display device 20 from the first image signal to the second image signal, the image switching control unit 130A controls the second switching unit 162 to switch the connection destination of the DP signal line from the CPU 110 to the SOC 120. Specifically, when switching the image signal to be displayed on the display device 20 from the first image signal to the second image signal, the image switching control unit 130A controls the DP control signal from Low to High, for example.

Further, when switching the image signal to be displayed on the display device 20 from the second image signal to the first image signal, the image switching control unit 130A controls the second switching unit 162 to switch the connection destination of the DP signal line from the SOC 120 to the CPU 110. Specifically, when switching the image signal to be displayed on the display device 20 from the second image signal to the first image signal, the image switching control unit 130A controls the DP control signal from High to Low, for example.

Further, when switching the image signal to be displayed on the display device 20 from one of the first image signal and the second image signal to the other, the image switching control unit 130A controls the first switching unit 161 to electrically disconnect the CC signal line temporarily from a state where the CC signal line is being electrically connected to the first processing unit and the second processing unit. For example, when switching the image signal to be displayed on the display device 20 from one of the first image signal and the second image signal to the other, the image switching control unit 130A controls the CC control signal temporarily from High to Low.

Further, after controlling the second switching unit 162 to switch the connection destination of the DP signal line, the image switching control unit 130A controls the first switching unit 161 to electrically connect the CC signal line from a state where the CC signal line is being electrically disconnected temporarily from the CPU 110 and the SOC 120. In other words, when switching between the image signals, the image switching control unit 130A controls the CC control signal from High to Low, and after controlling the DP control signal from Low to High or from High to Low, the image switching control unit 130A returns, to High, the CC control signal controlled to be Low.

Figure 3:
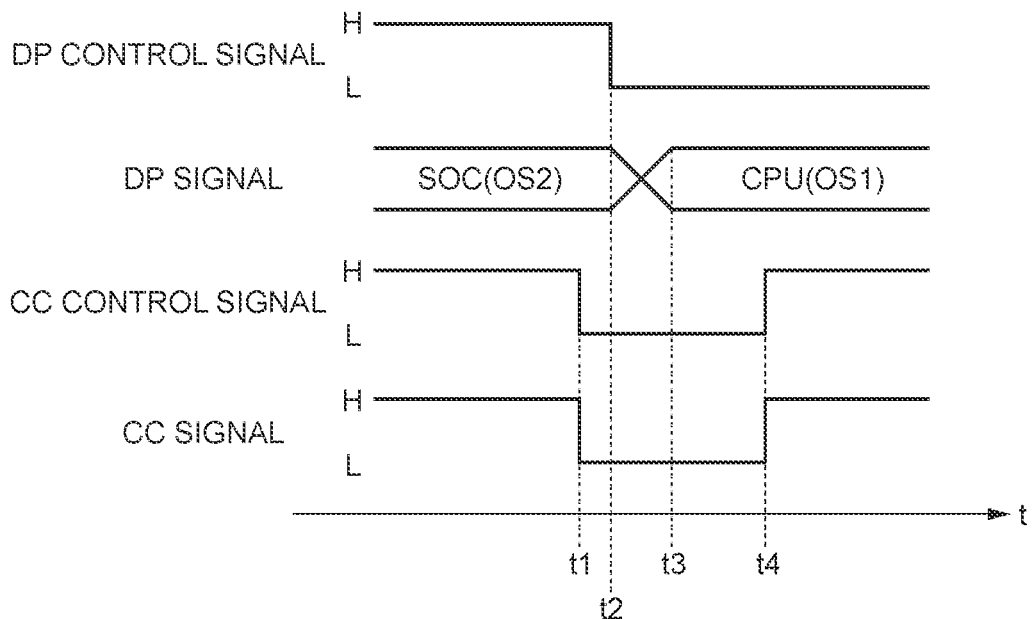
FIG. 3 is a timing chart illustrating an example of control timings of switching control of image signals according to one or more embodiments.

FIG. 3 is a timing chart illustrating an example of control timings of switching control of image signals according to one or more embodiments. In FIG. 3, the horizontal axis is expressed as a time (t) axis to illustrate relationships among respective timings of switching of the DP control signal, the connection destination of the DP signal, the CC control signal, and the CC signal upon switching from the second image signal to the first image signal.

First, at time t1, the image switching control unit 130A controls the CC control signal from High to Low. In response to this control, the connection of the first switching unit 161 is switched to switch the CC signal from High to Low. Next, at time t2, the image switching control unit 130A controls the DP control signal from High to Low. In response to this control, the connection of the second switching unit 162 is switched to switch the connection destination of the DP signal from the SOC 120 executing processing based on the OS2 to the CPU 110 executing processing based on the OS1. In the illustrated example, the connection of the second switching unit 162 is switched in a period from time t2 to time t3. After that, at time t4, the image switching control unit 130A controls the CC control signal from Low to High. In response to this control, the connection of the first switching unit 161 is switched to switch the CC signal from Low to High. Here, time t4 is preset to the time after completion of switching of the connection of the second switching unit 162. For example, time t4 is preset to the time after a preset time period from time t2 based on the specifications of the first switching unit 161 or the like so that time t4 comes after completion of switching of the connection of the second switching unit 162.

Thus, despite the state where the display device 20 is connected to the display port 170, the CC signal becomes a waveform similar to the waveform of the CC signal when the display device 20 is connected again after being disconnected once. Therefore, the connection with the display device 20 is initialized, and one of the CPU 110 and the SOC 120, from which the DP signal line is electrically connected to the display port 170 (that is, one of the CPU 110 and the SOC 120 after the connection is switched), can receive the EDID from the display device 20 and output an image signal corresponding to the EDID.

In the illustrated example, the example in which the DP control signal is controlled from High to Low after the CC control signal is controlled from High to Low is illustrated, but the present disclosure is not limited to this example. Whichever may come first, the timing of controlling the CC control signal from High to Low or the timing of controlling the DP control signal from High to Low, or both may be simultaneous.

Further, when switching from the first image signal to the second image signal, only a point different from the timing chart illustrated in FIG. 3 is that the image switching control unit 130A controls the DP control signal from Low to High at time t2. The control timing of the CC control signal is the same as the case when switching from the second image signal to the first image signal.

[Operation of Image Signal Switching Control Processing]

Figure 4:
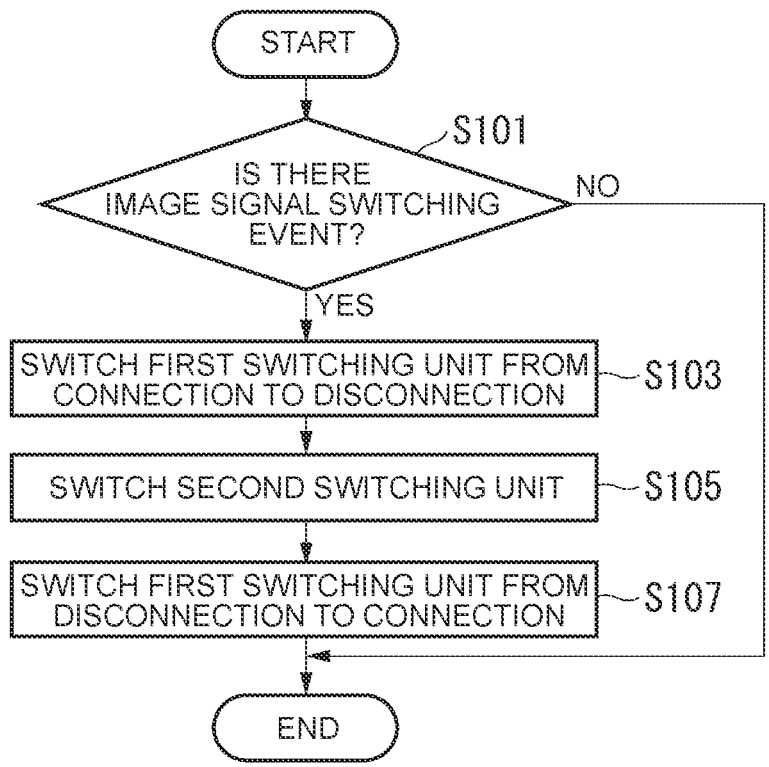
FIG. 4 is a flowchart illustrating an example of image signal switching control processing according to one or more embodiments.

Referring next to FIG. 4, the operation of image signal switching control processing executed by the information processing apparatus 10 will be described. FIG. 4 is a flowchart illustrating an example of image signal switching control processing according to one or more embodiments.

(Step S101) The image switching control unit 130A determines the presence or absence of an image signal switching event.

Here, the image signal switching event is a user operation event to a UI (User Interface), for example, in order to select which of the screen by the OS1 and the screen by the OS2 is to be displayed. This UI is an operation icon or the like displayed on the display device 20 by the function of a driver or an application program running on the OS1 or the OS2. For example, when the screen by the OS1 is currently displayed on the display device 20 (that is, when the first image signal is being output from the display port 170), a UI is displayed on the display device 20 by the function of a driver or an application program running on the OS1 to switch from the screen by the OS1 to the screen by the OS2. The user operates on this UI to generate a switching event from the first image signal to the second image signal.

The image signal switching event may also be an event accompanied with the transition of the operating state of the information processing apparatus 10. For example, when the operating state of the OS1 is a standby state (sleep state) and time information and the like are displayed on the display device 20 by processing based on the OS2, a switching event from the second image signal to the first image signal may be generated in response to returning of the operating state of the OS1 from the standby state (sleep state) to a normal operation (boot). A trigger to make the operating state of the OS1 return from the standby state (sleep state) to the normal operation (boot) may be a user's operation on the keyboard or may be the detection of approach of a person when the information processing apparatus 10 has a sensor for detecting the approach of a person.

In step S101, when determining that there is no image signal switching event (NO), the image switching control unit 130A executes the process in step S101 again. On the other hand, when determining that there is an image signal switching event (YES), the image switching control unit 130A proceeds to a process in step S103.

(Step S103) The image switching control unit 130A performs control to switch the connection of the first switching unit 161 so as to make the CC signal line electrically disconnected from a state of being electrically connected to the first processing unit and the second processing unit. For example, the image switching control unit 130A controls the CC control signal from High to Low. Then, the image switching control unit 130A proceeds to a process in step S105.

(Step S105) The image switching control unit 130A performs control to switch the connection of the second switching unit 162. For example, when the image signal to be displayed on the display device 20 is switched from the first image signal to the second image signal, the image switching control unit 130A controls the second switching unit 162 to switch the connection destination of the DP signal line from the CPU 110 to the SOC 120. Specifically, when switching the image signal to be displayed on the display device 20 from the first image signal to the second image signal, for example, the image switching control unit 130A controls the DP control signal from Low to High. On the other hand, when switching the image signal to be displayed on the display device 20 from the second image signal to the first image signal, the image switching control unit 130A controls the second switching unit 162 to switch the connection destination of the DP signal line from the SOC 120 to the CPU 110. Specifically, when switching the image signal to be displayed on the display device 20 from the second image signal to the first image signal, for example, the image switching control unit 130A controls the DP control signal from High to Low. Then, the image switching control unit 130A proceeds to a process in step S107.

(Step S107) The image switching control unit 130A performs control to switch the connection of the first switching unit 161 so as to make the CC signal line electrically connected from the state of being electrically disconnected from the CPU 110 and the SOC 120. For example, the image switching control unit 130A returns the CC control signal from Low to High.

Note that the order of step S103 and step S105 may be reversed or simultaneous as described above.

As described above, the information processing apparatus 10 according to one or more embodiments includes: the CPU 110 (the example of the first processing unit) which generates the first image signal based on processing by the OS1 (first OS); the SOC 120 (the example of the second processing unit) which generates the second image signal based on processing by the OS2 (second OS); the display port 170 (the example of the interface unit); the first switching unit 161; and the second switching unit 162. The display port 170 is connected to one end of the CC signal line (the example of the first signal line) which transmits the CC signal (the example of the first signal) according to the connection with the display device 20. Further, the display port 170 is connected to one end of the DP signal line (the example of the second signal line) capable of transmitting the DP signal (the example of the second signal) including information (for example, EDID) related to the specifications of the display device 20 received from the display device 20 in response to being connected to the display device 20, and either one of the first image signal and the second image signal to be output to the display device 20. The first switching unit 161 is connected to the other end of the CC signal line the one end of which is connected to the display port 170 to switch (i.e. select) whether to electrically connect the CC signal line to the CPU 110 and the SOC 120 or to electrically disconnect the CC signal line therefrom. The second switching unit 162 is connected to the other end of the DP signal line the one end of which is connected to the display port 170 to switch to (i.e. select) which of the CPU 110 and the SOC 120 the DP signal line is to be connected.

Thus, in the system equipped with two or more OSs, when switching between image signals by respective processing of the two or more OSs to display either one of the image signals on the display device 20, the information processing apparatus 10 can switch between the image signals even in a state where the display device 20 remains connected, and can connect the CC signal line after being electrically disconnected. Therefore, since the information processing apparatus 10 can initialize connection processing to receive EDID upon switching between the image signals even in the state where the display device 20 remains connected, displays by respective processing of the two or more OSs can be switched properly in the system equipped with the two or more OSs.

Further, the information processing apparatus 10 includes the image switching control unit 130A (the example of the control unit) to control switching by the first switching unit 161 and switching by the second switching unit 162 upon switching the image signal to be displayed on the display device 20 from one of the first image signal and the second image signal to the other.

Thus, when an image signal switching event occurs, since the information processing apparatus 10 can perform control to switch between image signals and control to connect the CC signal after being electrically disconnected, displays by respective processing of the two or more OSs can be switched properly.

Further, when switching the image signal to be displayed on the display device 20 from the first image signal to the second image signal, the image switching control unit 130A controls the second switching unit 162 to switch the connection destination of the DP signal line from the CPU 110 to the SOC 120. On the other hand, when switching the image signal to be displayed on the display device 20 from the second image signal to the first image signal, the image switching control unit 130A controls the second switching unit 162 to switch the connection destination of the DP signal line from the SOC 120 to the CPU 110.

Thus, the information processing apparatus 10 can properly control both switching from the first image signal based on the processing by the OS1 to the second image signal based on the processing by the OS2, and switching from the second image signal based on the processing by the OS2 to the first image signal based on the processing by the OS1. In other words, the information processing apparatus 10 can properly control both switching from the screen by the OS1 to the screen by the OS2, and switching from the screen by the OS2 to the screen by the OS1.

Further, when switching the image signal to be displayed on the display device 20 from one of the first image signal and the second image signal to the other, the image switching control unit 130A controls the first switching unit 161 to electrically disconnect the CC signal line temporarily from the state where the CC signal line is being electrically connected to the CPU 110 and the SOC 120.

Thus, since the information processing apparatus 10 can initialize connection processing to receive EDID upon switching between the image signals even in the state where the display device 20 remains connected, displays by respective processing of the two or more OSs can be switched properly.

Further, after controlling the second switching unit 162 to switch the connection destination of the DP signal line, the image switching control unit 130A controls the first switching unit 161 to electrically connect the CC signal line from the state of being electrically disconnected temporarily from the CPU 110 and the SOC 120.

Thus, since EDID is transmitted from the display device 20 to the information processing apparatus 10 after the connection destination of the DP signal line is switched in response to switching between the image signals, either one of the CPU 110 and the SOC 120 on the side of outputting the image signal after being switched can receive the EDID.

Further, since the first switching unit 161 is configured by using the photo MOS relay, two-way communication is enabled. Thus, the first switching unit 161 does not interfere with the communication of the CC signal on the CC signal line. Therefore, the first switching unit 161 does not interfere with communication to other devices (such as the camera 113, the camera 123 and the like) connected using the USB Type-C interface.

Further, a control method in the information processing apparatus 10 according to one or more embodiments is a control method in the information processing apparatus 10 including the display port 170 connected to one end of the CC signal line for transmitting the CC signal according to the connection with the display device 20, and connected to one end of the DP signal line capable of transmitting the DP signal including information (for example, EDID) related to the specifications of the display device 20 received from the display device 20 in response to being connected to the display device 20, and either one of the first image signal and the second image signal to be output to the display device 20, the control method including a first processing step, a second processing step, a first switching step, and a second switching step. In the first processing step, the CPU 110 generates the first image signal based on processing by the OS1. In the second processing step, the SOC 120 generates the second image signal based on processing by the OS2. In the first switching step, the first switching unit 161 connected to the other end of the CC signal line switches whether to electrically connect the CC signal line to the CPU 110 and the SOC 120 or to electrically disconnected therefrom. In the second switching step, the second switching unit 162 connected to the other end of the DP signal line switches to which of the CPU 110 and the SOC 120 the DP signal line is to be connected.

Thus, when switching between image signals by respective processing of the two or more OSs in the system equipped with the two or more OSs to display either one of the image signals on the display device 20, the control method in the information processing apparatus 10 can switch between the image signals even in the state where the display device 20 remains connected, and can connect the CC signal line after being electrically disconnected. Therefore, since the control method in the information processing apparatus 10 can initialize connection processing to receive EDID upon switching between the image signals even in the state where the display device 20 remains connected, displays by respective processing of the two or more OSs can be switched properly in the system equipped with the two or more OSs.

While the embodiments of this invention have been described above with reference to the accompanying drawings, the specific configurations are not limited to those described above, and various design changes can be made without departing from the scope of this invention. For example, the configurations described in the aforementioned embodiments may be combined arbitrarily.

Further, in the aforementioned embodiments, the example in which the first switching unit 161 is configured by using the photo MOS relay, but the present disclosure is not limited to this example. For example, the first switching unit 161 may also be configured by using any other switching device having bidirectional conduction characteristics.

Further, in the aforementioned embodiments, the example in which the display device 20 is connected to the display port 170 is illustrated, but the display port 170 may also be connected to the display device 20 after being converted to any other image output interface.

Further, in the aforementioned embodiments, the configuration example in which the image switching control unit 130A is included in the EC 130 is illustrated, but the present disclosure is not limited to this example. The EC 130 is an example of a microcomputer, and the present disclosure is not limited to this example.

Further, in the aforementioned embodiments, the example in which the CPU 110 composed of plural ICs such as a CPU, a chipset and the like is taken as an example of the first processing unit which executes processing based on the OS1, and the SOC 120 composed of plural ICs, such as a CPU, a chipset, a GPU and the like, integrated into a single chip is taken as an example of the second processing unit which executes processing based on the OS2 is described, but the present disclosure is not limited to this example. For example, the first processing unit which executes the processing based on the OS1 may be configured as an SOC in which plural ICs are integrated into a single chip, or the second processing unit which executes the processing based on the OS2 may be configured to include plural ICs such as a CPU, a chipset and the like.

Further, in the aforementioned embodiments, the example in which the OS1 is Windows (registered trademark) and the OS2 is Android (registered trademark) is described, but the types of OSs and the combination thereof are not limited to this example. For example, the OS1 and the OS2 may also be of the same type. For example, both of the OS1 and the OS2 may be Windows (registered trademark), or both of them may be Android (registered trademark). Further, both or either of the OS1 and the OS2 may be an OS other than Windows (registered trademark) and Android (registered trademark).

Further, the information processing apparatus 10 described above has a computer system therein. Then, a program for implementing the function of each component included in the information processing apparatus 10 described above may be recorded on a computer-readable recording medium so that the program recorded on this recording medium is read into the computer system and executed to perform processing in each component included in the information processing apparatus 10 described above. Here, the fact that "the program recorded on the recording medium is read into the computer system and executed" includes installing the program on the computer system. It is assumed that the "computer system" here includes the OSs and hardware such as peripheral devices and the like. Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 10, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the above-described functions may be realized as an integrated circuit such as LSI (Large Scale Integration). Each of the functions may be implemented as a processor individually, or part or the whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

What is claimed is:

1. An information processing apparatus comprising:
   a first processor coupled to a first memory and programmed to execute a first operation system (OS) to output a first image signal;
   a second processor coupled to a second memory and programmed to execute a second OS to output a second image signal, the second processor being separate from the first processor;
   a display interface including a configuration channel (CC) signal line and an image signal line;
   a first switch that switches between:
      a state of connecting the CC signal line to both the first processor and the second processor, and
      a state of disconnecting the CC signal line from both the first processor and the second processor; and
   a second switch that switches between:
      a state of connecting the image signal line to the first image signal and disconnecting the image signal line from second image signal, and
      a state of connecting the image signal line to the second image signal and disconnecting the image signal line from first image signal.

2. An information processing apparatus comprising:
   a first processing unit which generates a first image signal based on processing by a first Operating System (OS);
   a second processing unit which generates a second image signal based on processing by a second OS;
   an interface unit connected to one end of a first signal line for transmitting a first signal according to a connection with a display device, and connected to one end of a second signal line capable of transmitting a second signal including information related to specifications of the display device received from the display device in response to being connected to the display device, and either one of the first image signal and the second image signal to be output to the display device;
   a first switching unit connected to the other end of the first signal line to select whether to electrically connect the first signal line to the first processing unit and the second processing unit or to electrically disconnect the first signal line therefrom; and
   a second switching unit connected to the other end of the second signal line to select which of the first processing unit and the second processing unit the second signal line is to be connected.

3. The information processing apparatus according to claim 2, further comprising
   a control unit which controls switching by the first switching unit and switching by the second switching unit when switching an image signal to be displayed on the display device from one of the first image signal and the second image signal to the other.

4. The information processing apparatus according to claim 3, wherein
   when switching the image signal to be displayed on the display device from the first image signal to the second image signal, the control unit controls the second switching unit to switch a connection destination of the second signal line from the first processing unit to the second processing unit, and
   when switching the image signal to be displayed on the display device from the second image signal to the first image signal, the control unit controls the second switching unit to switch the connection destination of the second signal line from the second processing unit to the first processing unit.

5. The information processing apparatus according to claim 3, wherein when switching the image signal to be displayed on the display device from one of the first image signal and the second image signal to the other, the control unit controls the first switching unit to electrically disconnect the first signal line temporarily from a state of being electrically connected to the first processing unit and the second processing unit.

6. The information processing apparatus according to claim 5, wherein after controlling the second switching unit to switch the connection destination of the second signal line, the control unit controls the first switching unit to electrically connect the first signal line to the first processing unit and the second processing unit from a state of being electrically disconnected temporarily therefrom.

7. The information processing apparatus according to claim 2, wherein the first switching unit is configured by using a photo MOS (Metal Oxide Semiconductor) relay.

8. A control method in an information processing apparatus including an interface unit connected to one end of a first signal line for transmitting a first signal according to a connection with a display device, and connected to one end of a second signal line capable of transmitting a second signal including information related to specifications of the display device received from the display device in response to being connected to the display device, and either one of a first image signal and a second image signal to be output to the display device, the control method comprising:
  generating, by a first processing unit, the first image signal based on processing by a first Operating System (OS);
  generating, by a second processing unit, the second image signal based on processing by a second OS;
  causing a first switching unit connected to the other end of the first signal line to select whether to electrically connect the first signal line to the first processing unit and the second processing unit or to electrically disconnected therefrom; and
  causing a second switching unit connected to the other end of the second signal line select to which of the first processing unit and the second processing unit the second signal line is to be connected.

\* \* \* \* \*